United States Patent
Yadav et al.

(10) Patent No.: US 11,334,773 B2
(45) Date of Patent: May 17, 2022

(54) TASK-BASED IMAGE MASKING

(71) Applicant: Amazon Technologies, Inc., Seattle, WA (US)

(72) Inventors: Vivek Yadav, Issaquah, WA (US); Aayush Gupta, Seattle, WA (US); Yue Wu, Torrance, CA (US); Pradeep Natarajan, Chicago, IL (US); Ayush Jaiswal, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 146 days.

(21) Appl. No.: 16/913,837

(22) Filed: Jun. 26, 2020

(65) Prior Publication Data

US 2021/0406589 A1  Dec. 30, 2021

(51) Int. Cl.
  *G06K 9/62* (2022.01)
  *G06N 3/08* (2006.01)
  *G06N 20/00* (2019.01)

(52) U.S. Cl.
  CPC .......... *G06K 9/628* (2013.01); *G06K 9/6256* (2013.01); *G06N 3/08* (2013.01); *G06N 20/00* (2019.01)

(58) Field of Classification Search
  CPC ........ G06N 3/0454; G06N 3/08; G06N 3/084; G06N 3/04; G06N 20/00; G06N 7/005; G06N 20/10; G06N 20/20; G06N 3/0481; G06N 3/063; G06N 5/04; G06N 5/045; G06N 3/0472; G06N 5/003; G06N 5/022; G06N 5/046; G06N 3/00; G06N 3/0445; G06N 3/082; G06N 3/006

USPC ......................................................... 382/224
See application file for complete search history.

(56) References Cited

U.S. PATENT DOCUMENTS

| | | |
|---|---|---|
| 2017/0178287 A1 | 6/2017 | Anderson |
| 2019/0279344 A1 | 9/2019 | Duggal et al. |
| 2020/0034565 A1 | 1/2020 | Kim |
| 2021/0056404 A1* | 2/2021 | Goswami ................ G06F 9/542 |
| 2021/0248514 A1* | 8/2021 | Cella .................... H04L 9/3231 |
| 2021/0264611 A1* | 8/2021 | Xue ..................... G06K 9/6202 |

OTHER PUBLICATIONS

International Search Report and Written Opinion, issued in International Application No. PCT/US2021/035166, dated Sep. 7, 2021, 17 pages.
M. Maximov, et al., "CIAGAN: Conditional Identity Anonymization Generative Adversarial Networks," 2020, IEEE/CVF Conference on Computer Vision and Pattern Recognition (CVPR). IEEE, Jun. 2020, 15 pages, arXiv preprint arXiv:2005.095442.

(Continued)

*Primary Examiner* — Ajibola A Akinyemi
(74) *Attorney, Agent, or Firm* — Pierce Atwood LLP

(57) ABSTRACT

Techniques for masking images based on a particular task are described. A system masks portions of an image that are not relevant to a particular task, thus, reducing the amount of data used by applications for image processing tasks. For example, images to be processed using a hair color classification model are masked so that only portions that show the person's hair are available for the model to analyze. The system configures different masker components to mask images for different tasks. A masker component can be implemented at a user device to mask images prior to sending to an application/task-specific model.

20 Claims, 11 Drawing Sheets

(56) References Cited

OTHER PUBLICATIONS

H. Hukkelas, et al., "DeepPrivacy: A Generative Adversarial Network for Face Anonymization," 2019, 14 pages, arXiv preprint arXiv:1909.04538.

C. Feutry, et al., "Learning Semi-Supervised Anonymized Representations by Mutual Information." 2020 IEEE International Conference on Acoustics, Speech and Signal Processing (ICASSP 2020), May 2020, 14 pages, retrieved from internet at https://hal-centralesupelec.archives-ouvertes.fr/hal-02572273/document.

R. Zhongzheng, et al., "Learning to Anonymize Faces for Privacy Preserving Action Detection," 2018, 17 pages, arXiv preprint arXiv:1803.11556.

N. Chhabra, "Generative Adversarial Networks for Image Anonymization," Master Thesis paper, 2019, 60 pages, retrieved from http://www.morrisriedel.de/wp-content/uploads/2019/05/2017-Master-Thesis-Nikhil-Chhabra.pdf.

C. Feutry, et al., "Learning Anonymized Representations with Adversarial Neural Networks," 2018, 20 pages, arXiv preprint arXiv:1802.09386.

G. Yanhui, et al., "A Face Replacement Neural Network for Image and Video" ICMLC 2019: In Proceedings of the 11th International Conference on Machine Learning and Computing, ACM, Feb. 2019, 5 pages.

O. Ronneberger, et al., "U_Net Convolutional Networks for Biomedical Image Segmentation," 2015, 8 pages, arXiv preprint arXiv:11505.04597.

Ji, Zhanglong, Zachary C. Lipton, and Charles Elkan. "Differential privacy and machine learning: a survey and review." arXiv preprint arXiv:1412.7584 (2014).

Yeom, Samuel, et al. "Privacy risk in machine learning: Analyzing the connection to overfitting." 2018 IEEE 31st Computer Security Foundations Symposium (CSF). IEEE, 2018.

Carlini, Nicholas, et al. "The secret sharer: Measuring unintended neural network memorization & extracting secrets." arXiv preprint arXiv:1802.08232 (2018).

Nasr, Milad, Reza Shokri, and Amir Houmansadr. "Machine learning with membership privacy using adversarial regularization." Proceedings of the 2018 ACM SIGSAC Conference on Computer and Communications Security. 2018.

Abadi, Martin, et al. "Deep learning with differential privacy." Proceedings of the 2016 ACM SIGSAC Conference on Computer and Communications Security. 2016.

Cuff, Paul, and Lanqing Yu. "Differential privacy as a mutual information constraint." Proceedings of the 2016 ACM SIGSAC Conference on Computer and Communications Security. 2016.

Mir, Darakhshan J. "Information-theoretic foundations of differential privacy." International Symposium on Foundations and Practice of Security. Springer, Berlin, Heidelberg, 2012.

Wang, Weina, Lei Ying, and Junshan Zhang. "On the relation between identifiability, differential privacy, and mutual-information privacy." IEEE Transactions on Information Theory 62.9 (2016): 5018-5029.

Li, Ninghui, et al. "Membership privacy: a unifying framework for privacy definitions." Proceedings of the 2013 ACM SIGSAC conference on Computer & communications security. 2013.

Chen, Tzer-Yeu, et al. "Trusting the computer in computer vision: A privacy-affirming framework." Proceedings of the IEEE Conference on Computer Vision and Pattern Recognition Workshops. 2017.

Li, Yitong, Timothy Baldwin, and Trevor Cohn. "Towards robust and privacy-preserving text representations." arXiv preprint arXiv:1805.06093 (2018).

Qian, Jianwei, et al. "Towards privacy-preserving speech data publishing." IEEE INFOCOM 2018-IEEE Conference on Computer Communications. IEEE, 2018.

Jordon, James, Jinsung Yoon, and Mihaela van der Schaar. "PATE-GAN: Generating synthetic data with differential privacy guarantees." (2018).

Wu, Yifan, et al. "Privacy-protective-GAN for privacy preserving face de-identification." Journal of Computer Science and Technology 34.1 (2019): 47-60.

Shirai, Sola, and Jacob Whitehill. "Privacy-Preserving Annotation of Face Images through Attribute-Preserving Face Synthesis." Proceedings of the IEEE Conference on Computer Vision and Pattern Recognition Workshops. 2019.

Raval, Nisarg, Ashwin Machanavajjhala, and Landon P. Cox. "Protecting visual secrets using adversarial nets." 2017 IEEE Conference on Computer Vision and Pattern Recognition Workshops (CVPRW). IEEE, 2017.

Orekondy, Tribhuvanesh, Mario Fritz, and Bernt Schiele. "Connecting pixels to privacy and utility: Automatic redaction of private information in images." Proceedings of the IEEE Conference on Computer Vision and Pattern Recognition. 2018.

Wu, Zhenyu, et al. "Towards privacy-preserving visual recognition via adversarial training: A pilot study." Proceedings of the European Conference on Computer Vision (ECCV). 2018.

Zhang, Xinyang, Shouling Ji, and Ting Wang. "Differentially private releasing via deep generative model (technical report)." arXiv preprint arXiv:1801.01594 (2018).

Lateef, Fahad, and Yassine Ruichek. "Survey on semantic segmentation using deep learning techniques." Neurocomputing 338 (2019): 321-348.

Goodfellow, Ian, et al. "Generative adversarial nets." Advances in neural information processing systems. 2014.

Olaf Ronneberger, Philipp Fischer, and Thomas Brox. U-net: Convolutional networks for biomedical image segmentation. In Nassir Navab, Joachim Homegger, William M. Wells, and Alejandro F. Frangi, editors, Medical Image Computing and Computer-Assisted Intervention—MICCAI 2015, pp. 234-241, Cham, 2015. Springer International Publishing. ISBN 978-3-319-24574-4.

F. Schroff, D. Kalenichenko, and J. Philbin. Facenet: A unified embedding for face recognition and clustering. In 2015 IEEE Conference on Computer Vision and Pattern Recognition (CVPR), pp. 815-823, 2015.

\* cited by examiner

525 Masked Image for hair-based classification task

520 Input image

510 Training Image with label "brown hair"

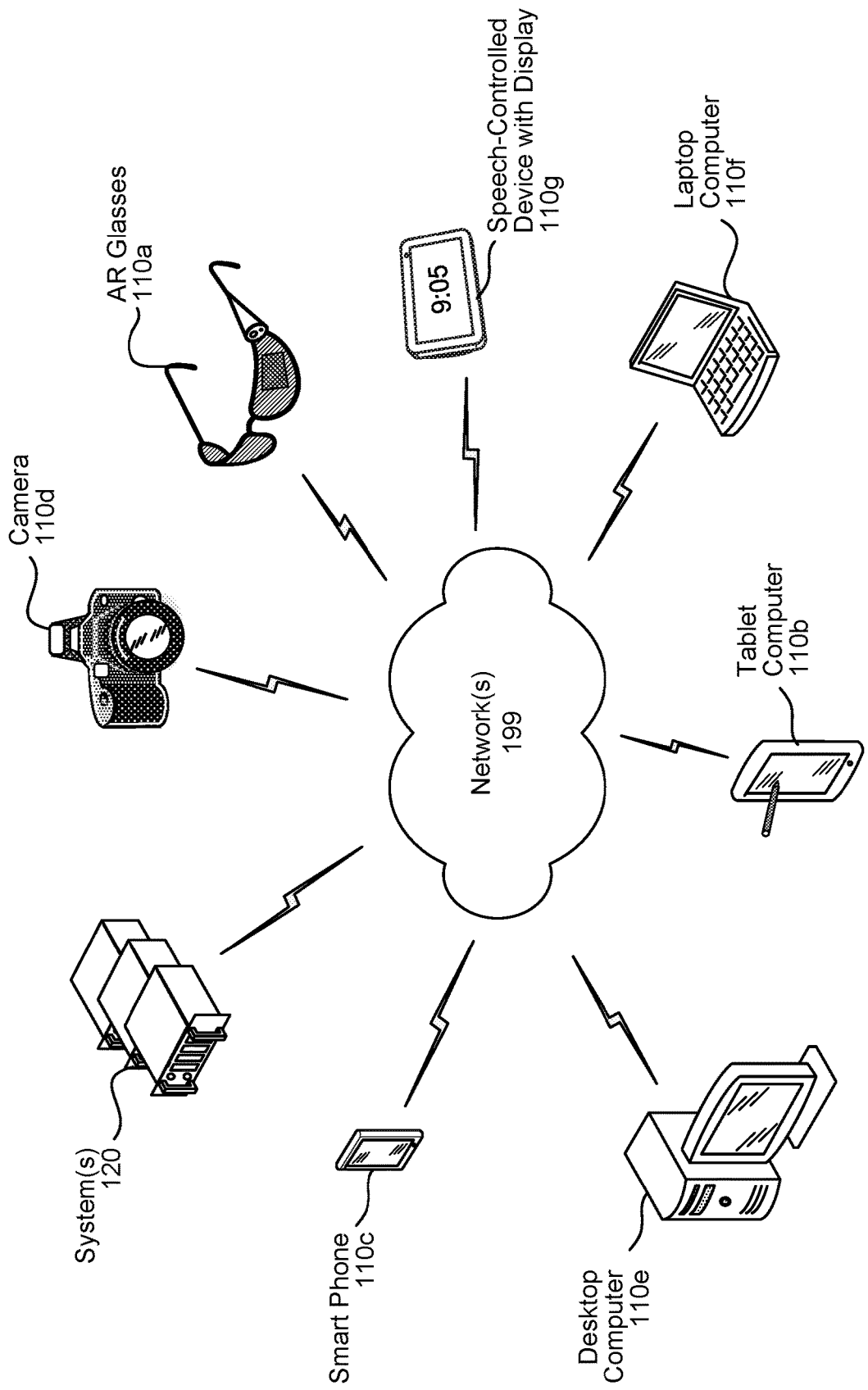

TASK-BASED IMAGE MASKING

BACKGROUND

Mobile electronic devices such as tablet computers, smart phones, and other electronic devices commonly include cameras. Images captured by these cameras may be processed to perform particular automated tasks, such as, image recognition, object identification, and other types of automated tasks. Performance of these tasks may require storing of images. The images may include information that can be used to determine a person's identity, location, etc.

BRIEF DESCRIPTION OF DRAWINGS

For a more complete understanding of the present disclosure, reference is now made to the following description taken in conjunction with the accompanying drawings.

FIG. 11 illustrates an example of networked devices for use with the system of the present disclosure.

DETAILED DESCRIPTION

Figure 1:
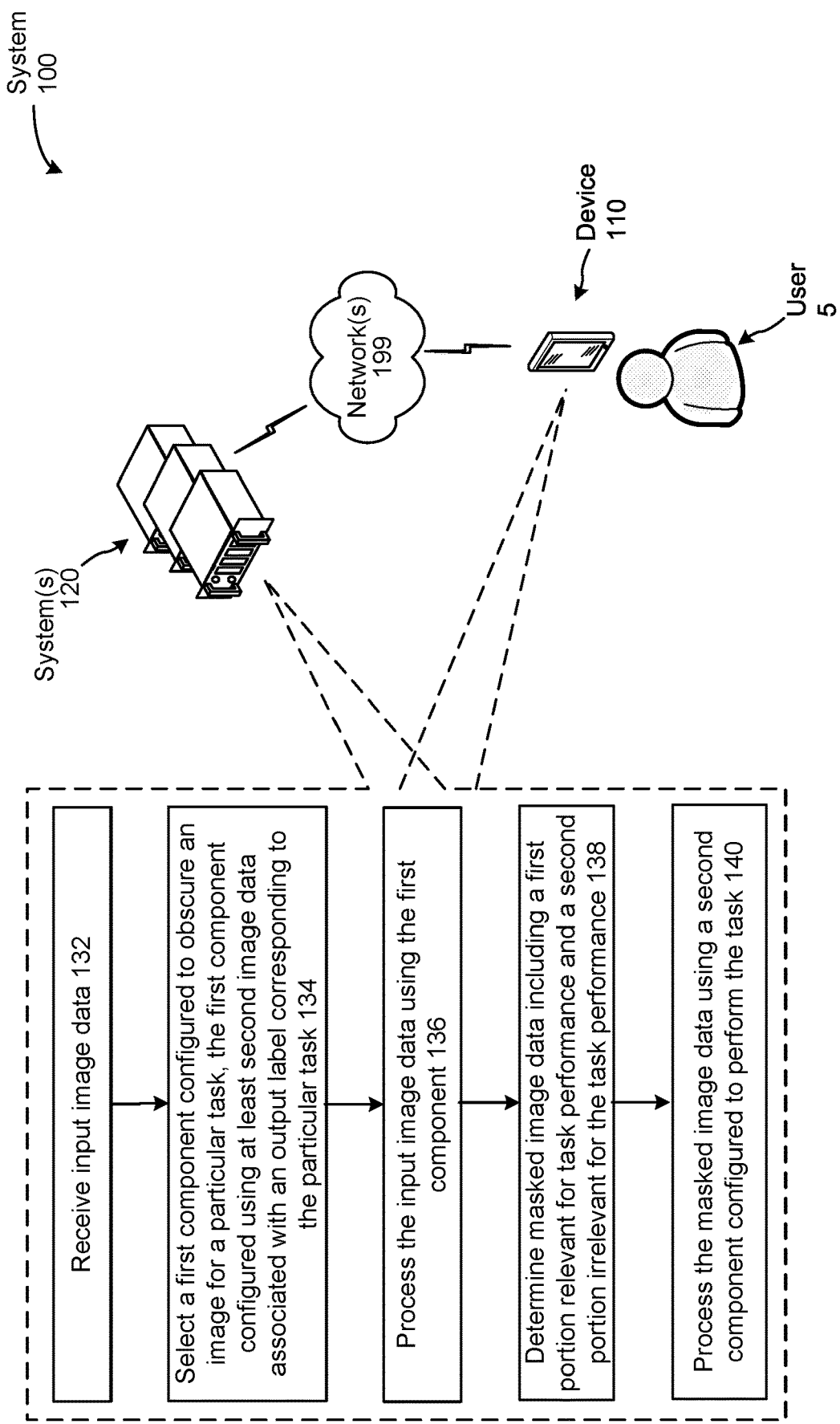
FIG. 1 illustrates a system for masking images based on task-relevant portions of the image according to embodiments of the present disclosure.

Image data can be collected through a variety of sensors on devices and used by online platforms/applications for conducting analytical studies and building machine learning (ML) models for research and commercial applications. For example, image data representing an image of a person may be used, where the image can include the person's face, surroundings, any objects in the background and other information. However, the storage of such image data as well as its use for training ML models sometimes involves storing information that is not needed for the task. This can introduce unnecessary risk of exposing personal information, such as a person's identity, location, possessions, etc.

In some instances, image data may be provided to human annotators for labeling to create a training dataset for a ML model. Image data may be stored so that a ML model may process it for particular automated tasks. The stored data could be used by malicious entities in determining a user's personal information.

The present disclosure relates to a system for automatic obfuscation of parts of an image that are irrelevant for performance of a particular task. For example, if an image is to be classified (e.g., using a ML model or human annotation) based on a person's hair color, the person's face and any background included in the image are irrelevant. The system of the present disclosure may, in this case, identify the portions of the image that represent hair, and obfuscate the other portions of the image by masking them. The generated masked image may then be stored and/or provided for further processing, in this example, for classification based on hair color.

The system of the present disclosure may determine masked images such that revealed (i.e., non-masked) content is maximally informative for the particular task, while also providing minimal overall information. For example, a person's background in the image can be masked when identifying facial expressions and/or other representations of emotions, while only the hair of a person may be revealed for analyzing hair features (e.g., hair type (straight or curly), hair color, hair length, etc.). In another example, a machine-readable code (e.g., a barcode, a quick-response (QR) code, natural language text, etc.) can be masked in images used for object recognition.

At least some systems require large amounts of annotated data with complex annotations, such as masked images revealing not much more than the hair of a person and/or masked images obfuscating the person's background. Training data labeled with simple annotations to configure a masker component for a particular task. For example, training data of the present disclosure may include images with labels identifying the hair color represented in the image (e.g., first image=brown; second image=blonde; etc.). In another example, the training data may include images with labels identifying the facial expression of the person in the image (e.g., first image=sad; second image=happy; etc.). Such training data can require less human annotation.

The system of the present disclosure may configure multiple masker components for different tasks. For example, a first masker component may be configured to mask images for classification based on hair features, a second masker component may be configured to mask images for identification of facial expressions, a third masker component may be configured to mask images for object identification, etc. In some embodiments, a masker component may be executed by a user device (e.g., a smartphone, a tablet, a laptop, a desktop computer, a speech-controlled device, etc.) and configured to generate masked image data prior to sending to a remote system (or another application included on the user device) for further processing.

In some embodiments, a masker component may include one or more ML models to generate masked image data. At least some systems may use computationally intensive methods for training ML models for masking images to determine an appropriate loss optimization parameter. The system, in some embodiments, may select pixels of an image that satisfy a condition (e.g., that correspond to one or more scores satisfying a particular threshold), and include the selected pixels in the revealed portion of the image (or the masked portion of the image based on the masker component's configuration). For example, the masker component may determine a likelihood of each pixel in the image data corresponding to a representation of hair, assign scores to each of the pixels based on the likelihood, and the top 25% of the pixels that are relevant for the task may be revealed/unmasked by the masker component for a hair feature classification task.

The system of the present disclosure may improve efficiency, for example, by identifying only the portions of the data needed for a particular task performed by applications and other system components, and reducing the amount of image data needed to be stored.

FIG. 1 illustrates a system 100 for masking images based on task-relevant portions in the images. The steps shown may be performed by a device 110 or a remote system(s) 120. Although the figures and discussion of the present disclosure illustrate certain steps in a particular order, the steps described may be performed in a different order (as well as certain steps removed or added) without departing from the present disclosure. As shown in FIG. 1, the system 100 may include a device 110 (local to a user 5) in communication with a system 120 across one or more networks 199. The network(s) 199 may include a local or private network or may include a wide network such as the Internet.

The device 110 may capture an image using a camera of (or otherwise in communication with) the device 110. The device 110/system(s) 120 receives (132) input image data representing the image. The device 110/system(s) 120 selects (134) a first component configured to obscure the input image data for a particular task, where the first component is configured using at least second image data associated with an output label corresponding to the particular task. The first component may be referred to as a masker component herein (e.g., 210, 310). As described below in detail, the masker component may be configured to mask image data for a particular task, so that portions irrelevant for the task are obscured. For example, for hair-based classification, the first component may select irrelevant pixels as those that do not represent hair in the image, and obscure these pixels to generate masked image data. The first component may, in at least some embodiments, be trained using image data with simple annotations corresponding to the task (e.g., first image data associated with the label "brown hair", second image data associated with the label "black hair", etc.).

In some embodiments, the device 110/system(s) 120 may determine which task is to be executed or which task the input image is to be used for. An application/component/system corresponding to the particular task may have been launched, and may request access (e.g., by asking the user to upload an image, asking the user to allow access to device memory, etc.) to one or more images captured using the device 110 or stored at the device 110. In response to such request, the device 110/system(s) 120 may select the first component that is configured to mask images for the particular task.

The device 110/system(s) 120, using the first component, processes (136) the input image data to determine (138) masked image data including a first portion of unmasked/non-obscured pixels (from the input image data) that are relevant for the task, and a second portion of pixels (from the input image data) that are obscured (e.g., blacked out, zeroed out, set to null values, or otherwise masked) due to the second portion of pixels being determined by the first component as not relevant to the task. The first component may determine a portion of the pixels to not mask based on a parameter value (e.g., K %). For example, the first component may determine to not mask 25% of the pixels relevant for the task. During configuration/training, the first component may learn to identify which pixels are relevant for a particular task. During runtime, the first component may assign a score/probability to each pixel in the input image data, where the score indicates a likelihood of the pixel being relevant for the task. Based on a K value of 25%, the first component may select to reveal the top 25% scoring pixels, and mask the remaining 75% of the pixels that may be relevant to the task.

The device 110/system(s) 120 processes (140) the masked image data using a second component that is configured to perform the task corresponding to the first component used to generate the masked image data. For example, the second component may be configured to classify image data based on the color of the person's hair.

In some embodiments, the device 110/system(s) 120 may select a third component configured to mask images for another task. For example, the third component may be a masker component (e.g., 210, 310) configured to mask pixels irrelevant for a facial emotion detection task.

In some embodiments, the device 110/system(s) 120 may process the input image data using two different masker components to determine two different masked images. For example, using the same input image data, the device 110/system(s) 120 may determine a masked image for a hair-based classification task and another masked image for a facial emotion detection task.

One or more components of the herein described systems may implement one or more trained machine learning models. Various machine learning techniques may be used to train and operate such models. Models may be trained and operated according to various machine learning techniques. Such techniques may include, for example, neural networks (such as deep learning neural networks, convolutional neural networks, and/or recurrent neural networks), inference engines, trained classifiers, etc. Examples of trained classifiers include Support Vector Machines (SVMs), neural networks, probabilistic graphs, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Processing by a neural network is determined by the learned weights on each node input and the structure of the network. Given a particular input, the neural network determines the output one layer at a time until the output layer of the entire network is calculated.

Connection weights may be initially learned by a neural network during training, where given inputs are associated with known outputs. In a set of training data, a variety of training examples are fed into the neural network. Each example typically sets the weights of the correct connections from input to output to 1 and gives all connections a weight of 0. In another embodiment, the initial connection weights are assigned randomly. As examples in the training data are processed by the neural network, an input may be sent to the neural network and compared with the associated output to determine how the neural network's performance compares to a target performance. Using a training technique, such as back propagation, the weights of the neural network may be updated to reduce errors made by the neural network when processing the training data.

For image processing, in particular, a convolutional neural network (CNN, or ConvNet) may be used to analyze visual features of images. CNN, also known as a shift invariant or space invariant artificial neural network (SIANN), may comprise a shared-weights architecture and translation invariance characteristics. A CNN may be used for image and video recognition, object identification, image classification, optical character recognition (OCR), face recognition, facial expression/emotion detection, natural language processing and other applications. CNNs are regularized versions of multilayer artificial neurons, meaning the CNN is a fully connected network(s), where each neuron in one layer is connected to all neurons in the next layer. CNNs take advantage of the hierarchical pattern in data and assemble more complex patterns (as compared to other types of neural networks) using smaller and simpler patterns.

In some embodiments, the components of the system described herein may use a CNN, a region-based CNN (RCNN), a Fast RCNN, Faster RCNN, Mask RCNN, or other types of artificial neural networks. In some embodiments, the components of the system described herein may use other types of ML models for image data processing. In some embodiments, the components of the system described herein may use algorithms/models to perform other image analysis/processing in addition to the ones described herein, such as image restoration, image enhancement, image synthesis, edge detection, image segmentation, histogram equalization, noise reduction, contrast enhancement, edge sharpening, and others.

Figure 2:
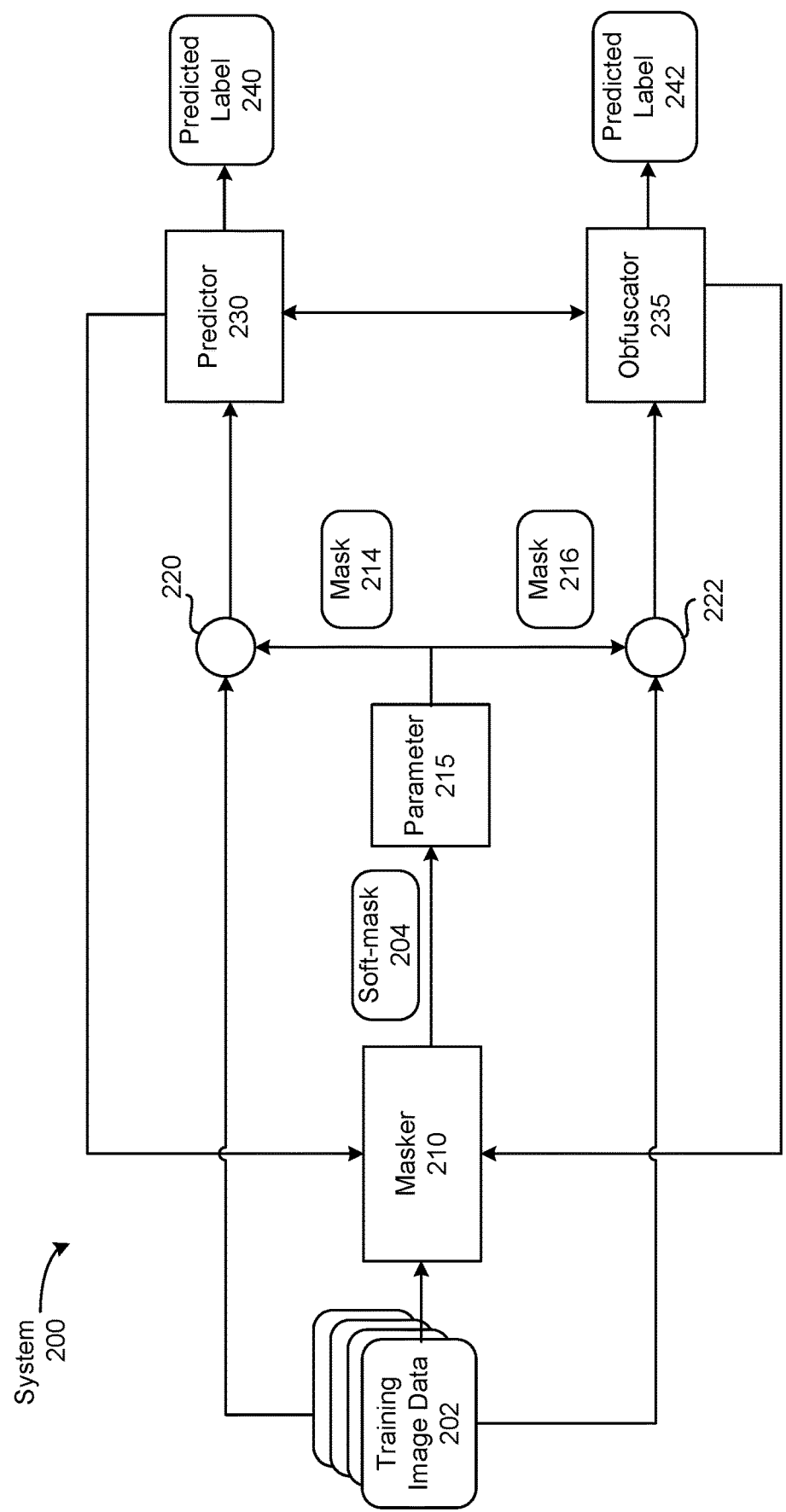
FIG. 2 is a conceptual diagram of a system that may be used to configure a masker component according to embodiments of the present disclosure.

FIG. 2 is a conceptual diagram of a system 200 that may be used to configure/train a masker component 210 to mask images for a particular task. As shown, the system 200 may include the masker component 210, a parameter component 215, a predictor component 230 and an obfuscator component 235. In the system 200, training image data 202 is input to the masker component 210, which produces a soft-mask 204 of the same resolution as the training image data 202. Next, the parameter component 215 selects a top K % pixels from the soft-mask to binarize and generate the mask data 214. An elementwise product between the binary mask data 214 and the training image data 202 is input to the predictor component 230, while an elementwise product between mask data 216 and the training image data 202 is input to the obfuscator component 235. The mask data 216 may be a complementary mask of the mask data 214, and may be generated by inverting the data of the mask 214, so that the mask data 216 reveals the irrelevant portions of the image for the task and masks the relevant portions of the image for the task. The system 200 trains the masker component 210 in an adversarial manner such that the input to the predictor component 230 corresponds to task-relevant information in the training image data 202.

The mask data 214 may be a matrix, where each value in the matrix corresponds to a pixel location in the image and the value indicates whether the pixel is relevant or irrelevant for the type of image processing task. For example, the mask data 214 may include the below matrix, assuming the image has 6×6 pixels:

| 0 | 1 | 1 |
|---|---|---|
| 1 | 0 | 0 |
| 0 | 0 | 0 |

In the above example, the pixel at row 1, column 1 (1,1) corresponds to 0, indicating that the pixel (1,1) is irrelevant for the image processing task. The elementwise product (resulting in data 220) causes the pixel (1,1) in the training image data 202 to be a null value (i.e. masked/blacked out). While the pixel at row 1, column 2 (1, 2) corresponds to 1, indicating that the pixel (1,2) is relevant for the image processing task. The elementwise product (resulting in data 220) causes the pixel (1,2) in the training image data 202 to retain the same pixel value as the training image data, thus revealing the pixel in the data 220.

In some embodiments, the mask data 214 may be a list of values (e.g., a vector, an array, a table, etc.) indicating which pixels to mask that are irrelevant to the image processing task. For example, the list of values may include pixel locations such as {(1,1), (2,2), (2,3)}, and data 220 may include these pixels as null values.

The mask data 216, similarly, may be a matrix or a list of values (e.g., a vector, an array, a table, etc.). The mask data 216 may be complementary of the mask data 214. For example, given the above matrix for mask data 214, the mask data 216 matrix may be:

| 1 | 0 | 0 |
|---|---|---|
| 0 | 1 | 1 |
| 1 | 1 | 1 |

In other embodiments, the mask data 216 may indicate different values for the pixels as compared to the mask data 214, and may not be an exact opposite/inversion of the mask data 214. The elementwise product of the mask data 216 and the training image data 202 produces image data 222, which masks the relevant portions for the image processing task, and makes the obfuscator component 235 to perform the image processing task without having the relevant portions available.

In some embodiments, the masked pixels/irrelevant pixels may be set to null values, or may be set to black color, or may be set to a color/pixel value other than that of the corresponding pixel in the input image, thus, obscuring the pixels irrelevant to the image processing task.

The system 200 may train the masker component 210 to produce a pixel-level binary mask that splits image data into two components—one that contains only the parts of the image data deemed necessary for the specific task the masker component 210 is trained for, and the other that contains the remaining parts of the image data (i.e. the parts that are not relevant for performance of the particular task). For example, to classify images based on a person's hair (e.g., hair color, texture, length, style, etc.), pixels representing a background and a person's face are not required. The system 200 configures the masker component 210, as described below, to mask the portions of the image not relevant for the performance of the task (in this case, mask all the pixels except the ones representing hair).

The training image data 202 may be a dataset of images to train the masker component 210 for a particular task. The training image data 202 may include training image data 202a corresponding to a first image, training image data 202b corresponding to a second image, training image data 202c corresponding a third image, and so on (e.g., training image data 202n corresponding to an Nth image). Each of the images represented by the training image data 202 may be, in some embodiments, annotated with a simple label/annotation based on the task the masker component 210 is being configured for. For example, for the task of classifying images based on hair color, the training image data 202 may include a first image associated with the label "brown hair", a second image associated with the label "black hair", a third image associated with the label "blonde hair", and so on. For the example task of detecting facial expression/emotion, the training image data 202 may include a first image associated with the label "happy", a second image associated with the label "sad", a third image associated with the label "neutral", and so on. For the example task of removing/masking a code (e.g., QR code, barcode, etc.) in an image, the training image data 202 may include a first image associated with the label "true"/"yes" indicating the image includes a code, and a second image associated with the label "false"/"no" indicating the image does not include a code. In some embodiments, the training image data 202 may include images with multiple labels related to a task. For example, for a hair-based classification task, the training image data 202 may include a first image associated with the labels: {color: brown}, {texture: straight}, {length: short}; a second image associated with the labels: {color: black}, {texture: curly}, {length: medium}; a third image associated with the labels: {color: blonde}, {texture: wavy}, {length: long}; and so on. While the foregoing describes an image being associated with three labels, it will be appreciated that an image may be associated with two, or more than three, labels without departing from the present disclosure.

The training image data 202 may be in a height-width-channel (HWC) format. In other embodiments, the training image data 202 may be in a channel-height-width (CHW) format. The soft-mask 204 may be the training image data 202 represented as H*W*1. In some embodiments, the masker component 210 may implement a U-Net architecture. The U-Net architecture of the masker component 210 may progressively downsample the training image data 202 until a bottleneck layer is reached and then upsample the hidden layer information to reconstruct an image of the same resolution but with a single channel (e.g., 64×64×1). In the final layer of the masker component 210, a sigmoid activation may be used to produce the soft-mask data 204.

The soft-mask 204 is input to the parameter component 215, which may be configured to apply a certain level of thresholding to the soft mask data 204 to generate the mask m data 214. The parameter component 215 selects a pre-defined top K % of pixels from the soft-mask data 204, and treats them as pixels-of-interest (as relevant to the particular task). The parameter component 215 binarizes the mask using the selected pixels by assigning a value of one (1) to the selected pixels and a value of zero (0) to the non-selected pixels. The parameter value K enables precise control of the percentage of pixels in the image that are revealed to a downstream task performance component. For example, a user (e.g., user developer or user administrator for the task performance component or the masker component) may set the value of K as 25%, such that only 25% of the pixels that are relevant to the task are used to perform a particular task (e.g., identify hair color), and the remaining 75% of the pixels that are relevant to the task are ignored/masked. Different variations of the K value are described in relation to FIG. 8. The use of a parameter (hyper-parameter) K in the present disclosure enables control over the amount of image data that is made available to image processing tasks. The K value is directly related to the amount of image data made available. For example, in some cases to avoid overfitting a machine learning model, it may be desirable to provide less image data to the image processing task, and the amount of data provided for the task can be controlled using the K parameter.

In some embodiments, the masker component 210 is configured to determine a value of K appropriate for the particular task. The masker component 210 may be configured to determine what amount of the image data is necessary for the type of image processing task. The masker component 210 may determine the K value based on the minimal amount of image data required by the predictor component 230 to accurately determine the predicted label 240 associated with the training image data 202. In some embodiments, the masker component 210 may test different K values to determine the best K value for the type of image processing task.

In applying K threshold value, the parameter component 215 generates a binary mask m that is used to split the image data into the two components $x_p$ (220) and $x_o$ (222). The first data ($x_p$) 220, input to the predictor component 230, is determined by performing an elementwise/pixelwise multiplication of the original training image data 202 (represented by x in the below equations) and the mask m data 214. For example, $$x_p = M \odot x \qquad \text{Equation (1)}$$

The second data ($x_o$) 222, input to the obfuscator component 235, is determined by performing an elementwise/pixelwise multiplication of the original training image data 202 and the mask 1-m data 216. For example, $$x_o = (1-m) \odot x \qquad \text{Equation (2)}$$

Next, the predictor component 230 processes the first data ($x_p$) 220 to determine a predicted label 240 corresponding to the training image data 202 using the masked image data represented by the first data 220. The system 200 is trained adversarially, such that at convergence, the predictor component 230 should be able to determine the predicted label 240 from $x_p$ (representing the masked image data that reveals only the relevant portions of the image for the task) but not from $x_o$ (representing the inverse of the masked image data that reveals only the non-relevant portions of the image for the task).

The predictor component 230 and obfuscator component 235 may share weights/model parameters and may implement the same model architecture. The predictor component 230 and the masker component 210 are tuned to use top K % of the pixels to provide the best performance of predicting the label of the training image data, whereas in the adversarial step, the masker component 210 is tuned so that the obfuscator component 235 is most confused in its predictions, i.e. predictions as close to random as possible. The model weights, parameters and other data learned by the predictor component 230 are used to update the model weights, parameters and other model data of the masker component 210. The model weights, parameters and other data learned by the obfuscator component 235 are also used to update model weights, parameters and other model data of the masker component 210.

Using the model data learned by the predictor component 230 and the obfuscator component 235, the masker component 210 is configured to determine an appropriate mask for an input image. The predictor component 230, during the training process, corresponds to a runtime component that may be configured to perform a particular task (e.g., task performance component 430). Based on how well the predictor component 230 is able to perform the prediction task using the masked image data 220, the masker component 210 is updated.

During the training process, the system 200 is configured to maximize label prediction accuracy from the predictor component 230, and maximize obfuscation/confusion of the prediction by the obfuscator component 235. In order to achieve this, the predictor component 230 is trained to minimize the cross entropy loss for the task-specific labels:

$$L_{predictor} = \Sigma_i^N - y_i * \log y_{p_i} \quad \text{Equation (3)}$$

where $y_i$ is the task label and $y_{p_i}$ is the prediction from the predictor component 230. The weights of the predictor component 230 and the masker component 210 are optimized to minimize the cross entropy loss. The system 200 back-propagates the masker component 210 weights and the predictor component 230 weights to minimize the cross-entropy for the pixels relevant to the task, and updates both the masker component 210 and the predictor component 230.

In order to confuse the model, a loss function that results in the most confusion between the prediction classes is used:

$$L_{obfuscator} = \sum_i^N \left( y_{o_i} - \frac{1}{N_{classes}} \right)^2 \quad \text{Equation (4)}$$

where $N_{classes}$ is the number of classes in the prediction task and $y_{o_i}$ is the prediction (predicted label 242) from the obfuscator component 235. In the obfuscator step, the weights of the masker component 210 are optimized to minimize the obfuscator loss. The masker component 210 is updated with the idea that the complementary mask (corresponding to 222) results in as much confusion as possible. The system 200 back-propagates the masker component 210 weights to confuse (make the predictor component 230 score 1/N-classes) for the pixels irrelevant to the task, and updates the masker component 210 to confuse the obfuscator component 235.

Figure 3:
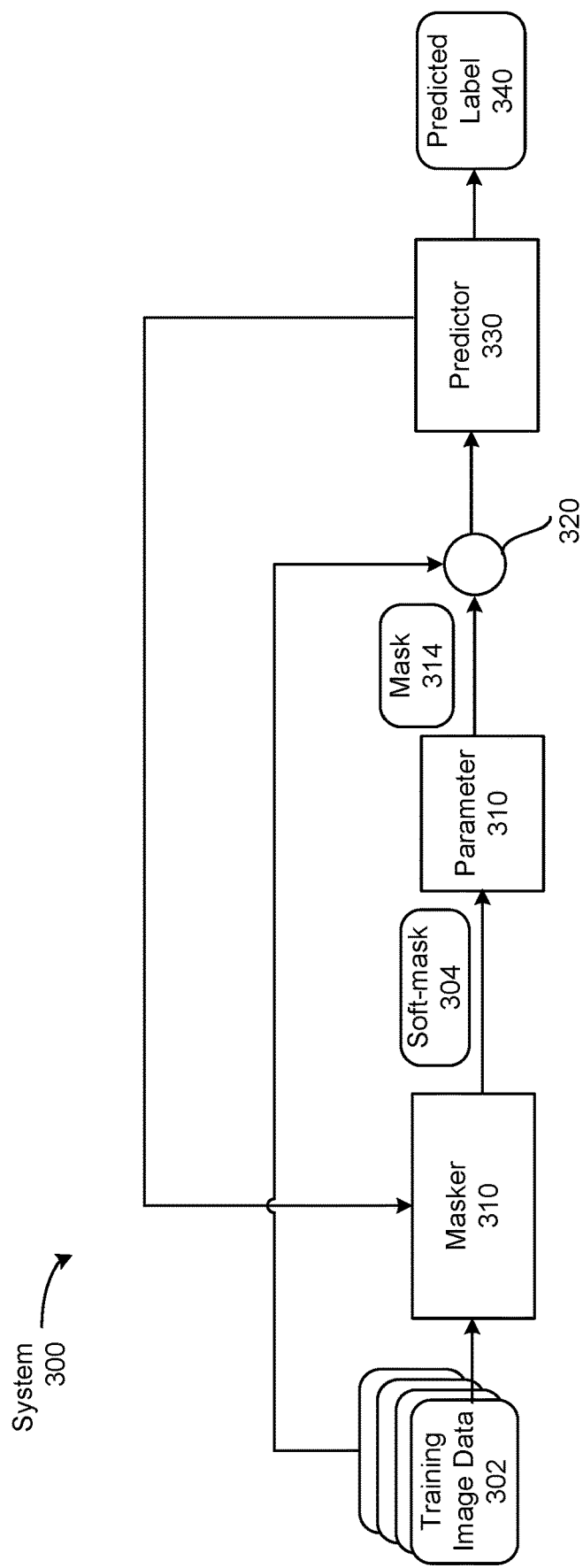
FIG. 3 is a conceptual diagram of another system that may be used to configure a masker component according to embodiments of the present disclosure.

FIG. 3 is a conceptual diagram of another example system 300 used to configure/train a masker component 310 to mask images for a particular task. As shown, the system 300 may include a masker component 310, a parameter component 315 and a predictor component 330. The system 300 may train the masker component in a non-adversarial manner. The system 300 may train the masker component 310 in a similar manner as described in relation to FIG. 2 above, but without the obfuscator component 235 performing the adversarial learning.

The training image data 302 may be similar to the training image data 202 described above, and may correspond to multiple images, where each image is associated with a simple label/annotation corresponding to the task that the masker component 310 is being configured for. The training image data 302 is input to the masker component 310, which generates a soft-mask 304 (in a similar manner as the soft-mask 204 is generated). The parameter component 310 may perform thresholding as described above in connection with the parameter component 210 to generate a binary pixel mask m 314.

The mask data 314 may be a matrix, where each value in the matrix corresponds to a pixel location in the image and the value indicates whether the pixel is relevant or irrelevant for the type of image processing task. For example, the mask data 314 may include the below matrix, assuming the image has 6×6 pixels:

| | | |
|---|---|---|
| 0 | 1 | 1 |
| 1 | 0 | 0 |
| 0 | 0 | 0 |

In the above example, the pixel at row 1, column 1 (1,1) corresponds to 0, indicating that the pixel (1,1) is irrelevant for the image processing task. The elementwise product (resulting in data 320) causes the pixel (1,1) in the training image data 302 to be a null value (i.e. masked/blacked out). While the pixel at row 1, column 2 (1, 2) corresponds to 1, indicating that the pixel (1,2) is relevant for the image processing task. The elementwise product (resulting in data 320) causes the pixel (1,2) in the training image data 302 to retain the same pixel value as the training image data, thus revealing the pixel in the data 320.

In some embodiments, the mask data 314 may be a list of values (e.g., a vector, an array, a table, etc.) indicating which pixels to mask that are irrelevant to the image processing task. For example, the list of values may include pixel locations such as {(1,1), (2,2), (2,3)}, and data 320 may include these pixels as null values.

The first data 320 may be determined by an elementwise product of the mask m 314 and the training image data 302. The first data 320 represents the masked image corresponding to the training image data 302, where the masked image reveals the relevant portions/pixels of the training image data 302 for the particular task the masker component 310 is being configured. The predictor component 330 may process the first data 320 to determine the predicted label 340 corresponding to the training image data 302.

The weights, parameters and other data learned by the predictor component 330 is used to update the masker component 310. During the training process, the system 300 back-propagates the weights of the masker component 310 and the weights of the predictor component 330 to minimize the cross entropy for the relevant pixels of the image.

Data, corresponding to the masker component 210/310 configured using the system 200/300, is stored for later runtime use. That is, the learned weights, parameters and other ML model data, corresponding to the masker component 210/310, is stored for later runtime use.

In some embodiments, the masker component 210/310 may be a U-Net type architecture CNN. In some embodiments, the predictor component 230/330 may be a neural network, for example, a CNN. In some embodiments, the obfuscator component 235 may be a neural network of the same type that the predictor component 230 implements, for example, a CNN. The predictor component 230/330 and the obfuscator component 235 may be classification networks with four convolutional layers (with batch-normalization, rectified linear unit (ReLU) activation and max-pooling (2×2 filter size)), one dense layer (followed by batch-normalization and ReLU) and a final classification dense layer with soft-max activation.

Figure 4:
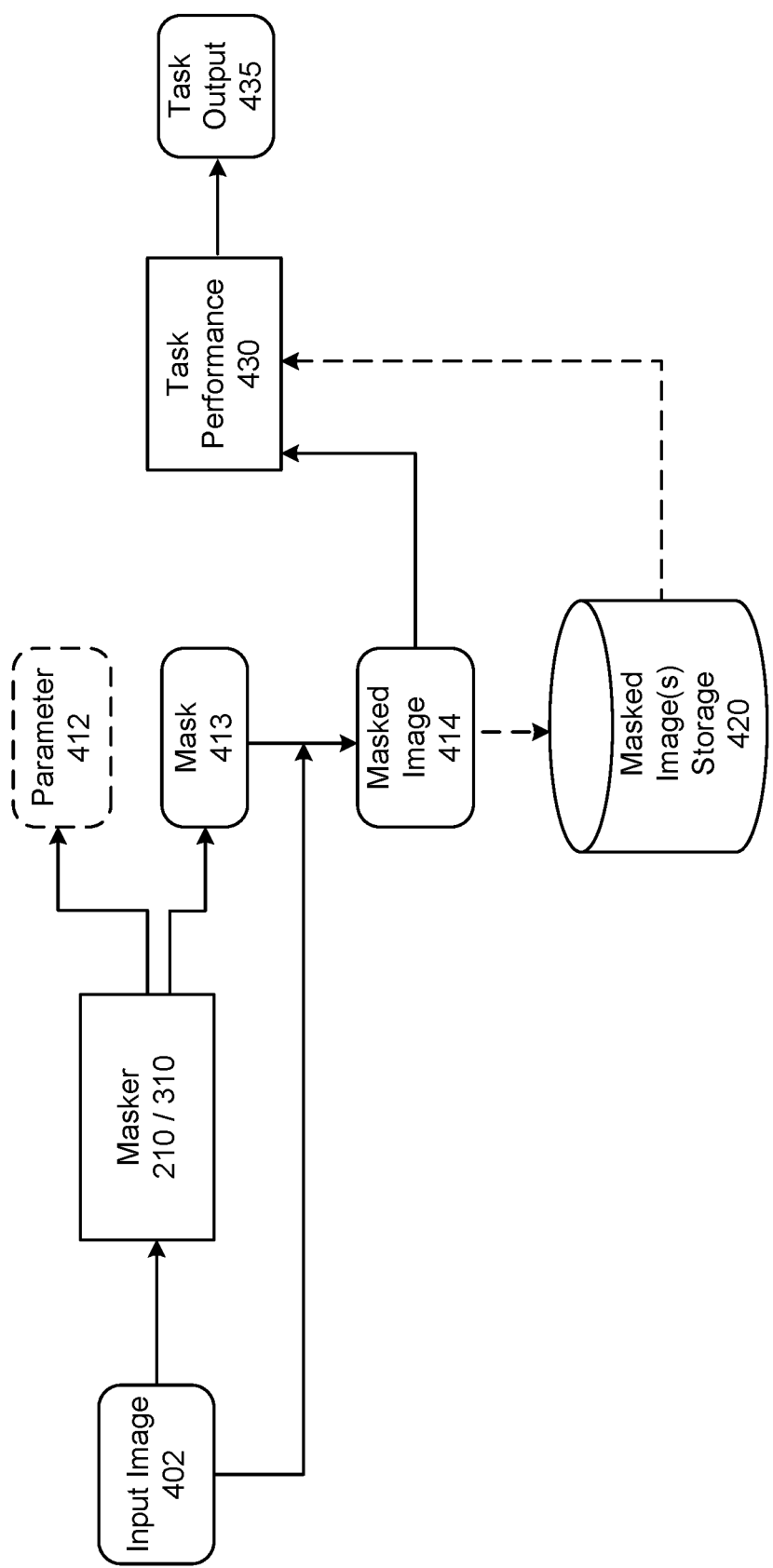
FIG. 4 is a conceptual diagram illustrating how a masker component may be used to mask images for a particular task according to embodiments of the present disclosure.

FIG. 4 is a conceptual diagram illustrating how the masker component 210/310 is used during runtime to mask images for a particular task according to embodiments of the present disclosure. In some embodiments, the masker component 210/310 may be included in/executed by the device 110, where the device 110 may capture the input image data 402 (using a camera implemented in or otherwise in communication with the device 110. In some cases, the input image data 402 may be captured by a first device 110a (e.g., smartphone) and provided to a second device 110b (e.g., desktop computer) that includes the masker component 210/310. In other embodiments, the masker component 210/310 may be included in/executed by the remote system(s) 120, where the device 110 may send the captured image data 402 to the remote system(s) 120 for processing.

Different instances of the masker component 210/310 may be included in the device 110/system(s) 120 to perform masking for different tasks. For example, a first masker component 210a/310a may be configured to mask images for a hair-based classification, a second masker component 210b/310b may be configured to mask images for facial expression/emotion detection, a third masker component 210c/310c may be configured to mask images to hide a code (e.g., QR code, barcode, etc.) in the image, and so on. Based on the task to be performed using the input image data 402, the device 110/system(s) 120 selects the appropriate masker component 210/310.

The masker component 210/310 processes the input image data 402 and generates the mask data 413. The mask data 413 may be pixel values representing portions of the input image data 402 that are relevant for the type of image processing task implemented by the task performance component 430. The mask data 413 may be a matrix, where each value in the matrix corresponds to a pixel location in the input image and the value indicates whether the pixel is relevant or irrelevant for the type of image processing task. For example, the mask data 413 may include the below matrix, assuming the image has 6×6 pixels:

| 1 | 0 | 0 |
| 1 | 0 | 0 |
| 0 | 0 | 0 |

In the above example, the pixel at row 1, column 1 (1,1) corresponds to 1, indicating that the pixel (1,1) is relevant for the image processing task, while pixel (1,2) is irrelevant for the task. In some embodiments, the mask data 413 may include values ranging between 0 and 1, and may indicate a likelihood of the respective pixel being relevant to the image processing task. For example, the pixel (1,1) may be associated with first likelihood data {0.8}, while the pixel (1,2) may be associated with second likelihood data {0.1}. In other embodiments, the mask data 413 may include values ranging between 0 and 100. In some embodiments, the mask data 413 may be a list of values (e.g., a vector, an array, a table, etc.) indicating which pixels to mask that are irrelevant to the image processing task. For example, the list of values may include pixel locations such as {(1,1), (2,2), (2,3)}, and the masked image data 414 may set these pixels to null values, black color, or pixel values different than the corresponding pixels in the input image data 402, thus obscuring these irrelevant pixels.

The masked image data 414 may be determined by an elementwise product between the mask data 413 and the input image data 402. The masked image data 414 includes a first portion of pixels that correspond to/are the same as a portion of the pixels of the input image data 402 that are relevant for the task. For example, the first portion of pixels of the masked image data 414 may correspond to a representation of hair in the input image data 402. The masked image data 414 includes a second portion of pixels that correspond to the remaining pixels of the input image data 402 that are not relevant for the task. The second portion of pixels in the masked image data 414 may be zeroed out, blacked out, obscured or otherwise have values different than the pixels relevant for the task. For example, the second portion of pixels of the masked image data 414 may correspond to representations of a background and a person's face in the input image data 402.

In some embodiments, the masker component 210/310 is configured to determine the parameter value K that is used to determine the masked image data 414. As described above, in some embodiments the top K % of pixels may be used to perform the task. The parameter value 412 may indicate what percentage of the image data is to be used by the task performance component 430. In some embodiments, the parameter value is predefined or configured by a user. The parameter value 412 may be used to determine the masked image data 414. In a non-limiting example, the mask data 413 may indicate a likelihood of a pixel being relevant for the task performance component 430. The parameter value 412 may indicate what percentage of the pixels are to be used by the task performance component 430, for example, the top 25% relevant pixels are to be used, and the masked image data 414 reveals the top 25% scoring pixels relevant for the task performance component 430, and obscures the remaining 75% of the pixels. In some embodiments, the masker component 210/310 selects the K value such that the least amount of image data necessary to perform the image processing task is provided to the task performance component 430.

In some embodiments, the masked image data 414 may be stored in a masked image(s) storage 420 for further processing by a task performance component 430. In other embodiments, the masked image data 414 may be provided directly to the task performance component 430 for further processing. In some embodiments, the masked image data 414 is provided to another device so that a user can perform manual annotation/labeling of images.

The task performance component 430 may be included in/executed by the remote system(s) 120. In some embodiments, the task performance component 430 may be included in/executed by the device 110. The task performance component 430 may be part of an application/app installed on the device 110 or may be part of an application executed by the system(s) 120. In some embodiments, the task performance component 430 may be the predictor component 230/330 configured as described above. The task performance component 430 may be configured to perform a task with respect to the input image data 402. An example task may be object recognition/identification, hair-based classification, facial expression/emotion detection, facial recognition, color-based classification, object based classification (e.g., whether an image includes a person, whether an image includes landscape, whether an image includes an animal, etc.) and other image processing tasks. The task performance component 430 may include/execute one or more ML models to process the masked image data 414.

The task performance component 430 may generate task output data 435. In some embodiments, the task output data 435 may be a label/class corresponding to the input image data 402 based on the task performed by the task performance component 430. For example, the task output data 435 may be "brown" indicating that the hair represented in the input image data 402 is of brown color. In another example, the task output data 435 may be "horse" indicating that the object represented in the input image data is a horse. In some embodiments, the task output data 435 may be a score/probability indicating a prediction likelihood corresponding to the input image data 402 determined by the task performance component 435. For example, if the task performance component 435 is configured to determine whether an input image corresponds to a particular class (e.g., the image includes a person or not) the task output data 435 may be 75% indicating that there is a 75% likelihood that the input image data 402 includes a person.

Figure 5C:
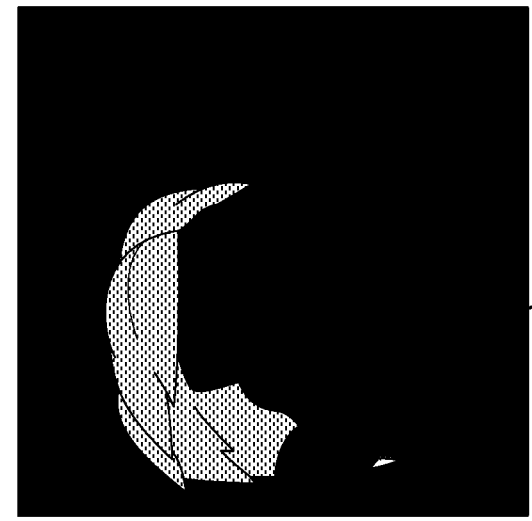
FIG. 5C shows an example masked image generated by the masker component configured for masking images for a hair-based classification task according to embodiments of the present disclosure.
Figure 5B:
FIG. 5B shows an example image processed at runtime using the masker component configured for masking images for a hair-based classification task according to embodiments of the present disclosure.
Figure 5A:
FIG. 5A shows an example image used for training a masker component for a hair-based classification task according to embodiments of the present disclosure.

FIG. 5A shows an example image 510 that may be included in the training image data 202/302 with a simple label. In this example, the masker component 210/310 may be trained for a hair-based classification task, and the example training image 510 may be of a person and may be labeled "brown hair" indicating the color of the person's hair.

FIG. 5B shows an example input image 520 that may be processed by the masker component 210/310. In this example, the masker component 210/310 may be configured to generate a masked image for a hair-based classification task. As shown, the input image 520 may be of a person and may include some buildings or landscape in the background.

FIG. 5C shows an example masked image 525 corresponding to the input image 520, where the masker component 210/310 is configured to generate masked image data (e.g., 414) representing the masked image 525 for a hair-based classification task. As shown, the masked image 525 reveals the portions corresponding to a representation of hair in the input image 520, and blacks/masks out the remaining portions (the person's face and background) that are irrelevant for a hair-based classification task. In this manner, the masker component 210/310 provides masked images that reveal the relevant portions of an image for a particular task, reducing exposure of personal information to other applications/systems.

Figure 6:
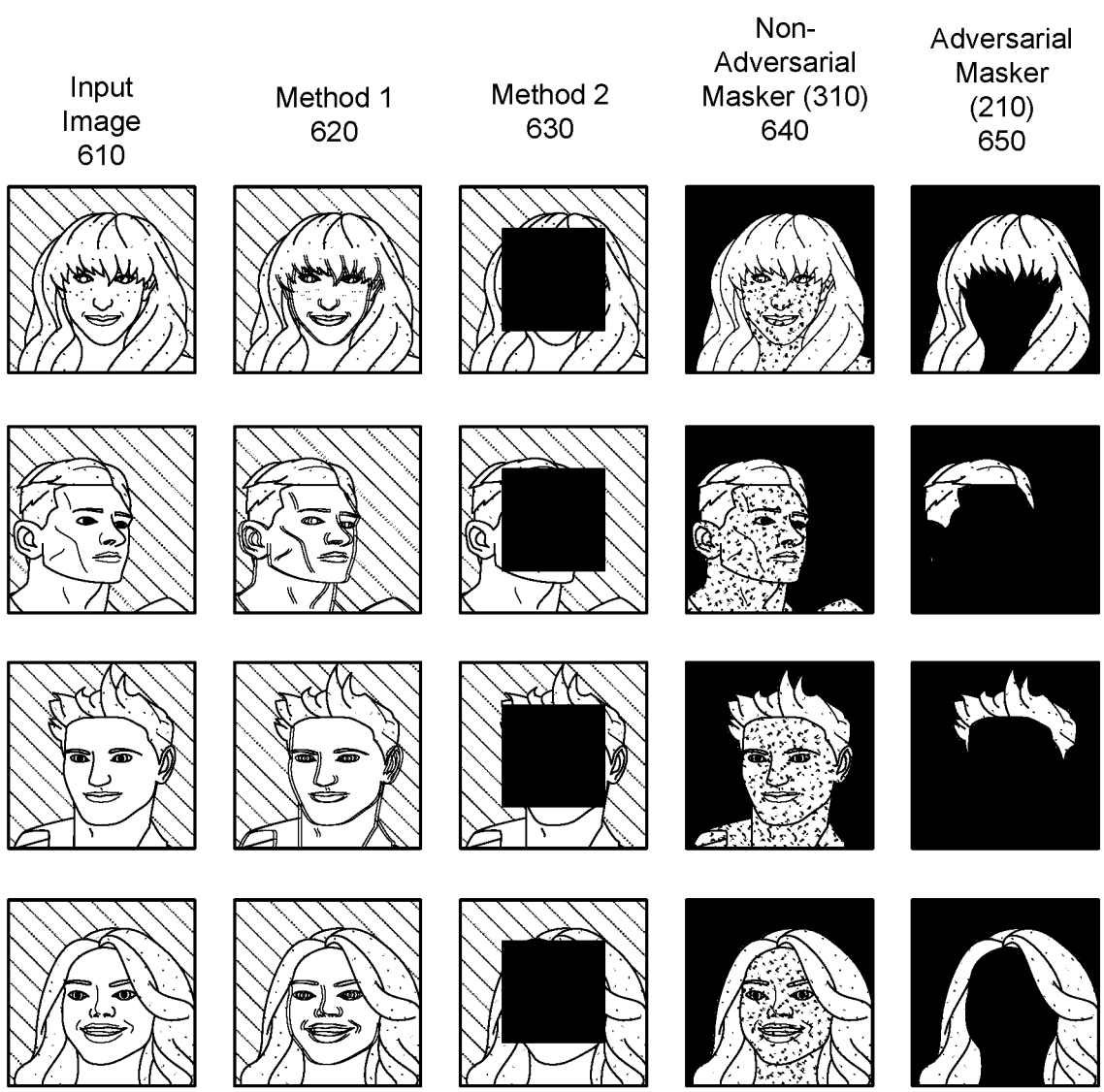
FIGS. 6 and 7 show a comparison of example original images, corresponding masked images generated by using various methods, and corresponding masked images generated using the system of the present disclosure.

FIG. 6 shows example input images 610 processed using two methods in addition to the non-adversarially trained masker component 310 and the adversarially trained masker component 210 to generate masked images. The input images 610 of FIG. 6 are masked for a hair-based classification task. The first method may include blurring the input image using a Gaussian kernel at the center (also known as Gaussian Blur). Since the example input images 610 are centered and aligned, most of the person's face can be hidden/distorted using the Gaussian Blur, as shown in example images 620. The second method may include using a block shape to black out the center part of the image, hiding the person's face, as shown in example images 630. The example images 640 are generated by the masker component 310 processing the input images 610, where the masker component 310 is trained in a non-adversarial manner, without the use of an obfuscator component, as described above in connection with FIG. 3. The example images 650 are generated by the masker component 210 processing the input images 610, where the masker component 210 is trained in an adversarial manner as described above in connection with FIG. 2. The masked images 640, 650 generated using the masker component 310 and 210 may result in better hair-based classification outcomes, while reducing the amount of data/pixels used by the classification task component. The block based method may block out more pixels related to the person's face compared to the masker components 210, 310, however, the masked images 630 may result in poor hair-based classification outcomes because relevant pixels are also blocked. The Gaussian blur based method may result in comparative hair-based classification outcomes as the masker component 310/210, but the masked images 620 reveal more pixels than necessary for the classification task.

Figure 7:
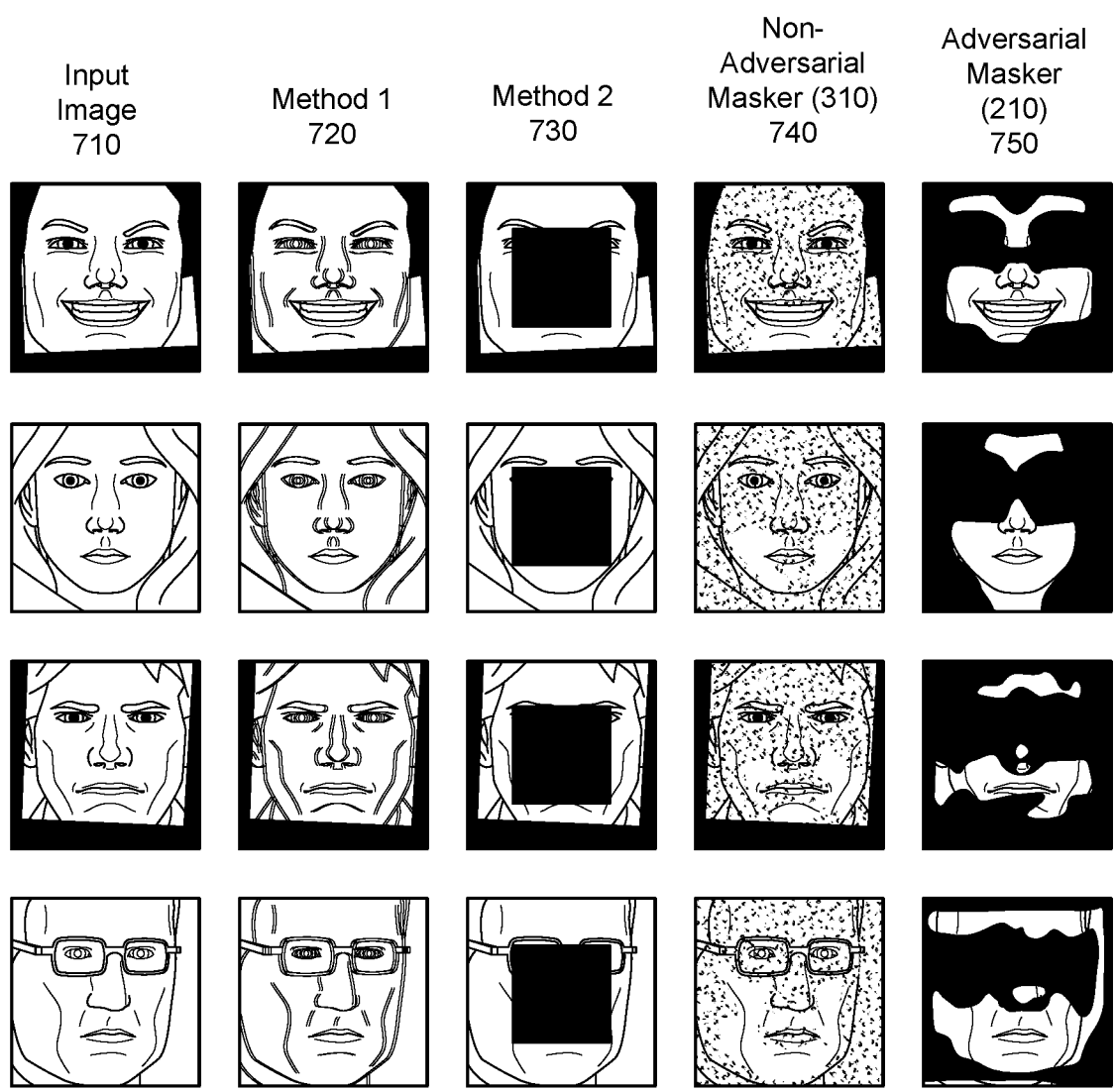

FIG. 7 shows example input images 710 processed using two methods in addition to the non-adversarially trained masker component 310 and the adversarially trained masker component 210 to generate masked images. The input images 710 of FIG. 7 are masked for a facial expression/emotion recognition task. The masked images 720 are generated using a Gaussian blur based method. The masked images 730 are generated using a block based method. The masked images 740 are generated by the masker component 310 processing the input images 710, where the masker component 310 is trained in a non-adversarial manner, without the use of an obfuscator component, as described above in connection with FIG. 3. The masked images 750 are generated by the masker component 210 processing the input images 710, where the masker component 210 is trained in an adversarial manner as described above in connection with FIG. 2. As illustrated, the masked images 740, 750 generated using the masker component 310 and 210 may result in better facial expression/emotion recognition outcomes, while reducing the amount of data/pixels used by the task component as compared to the other two methods.

Figure 8:
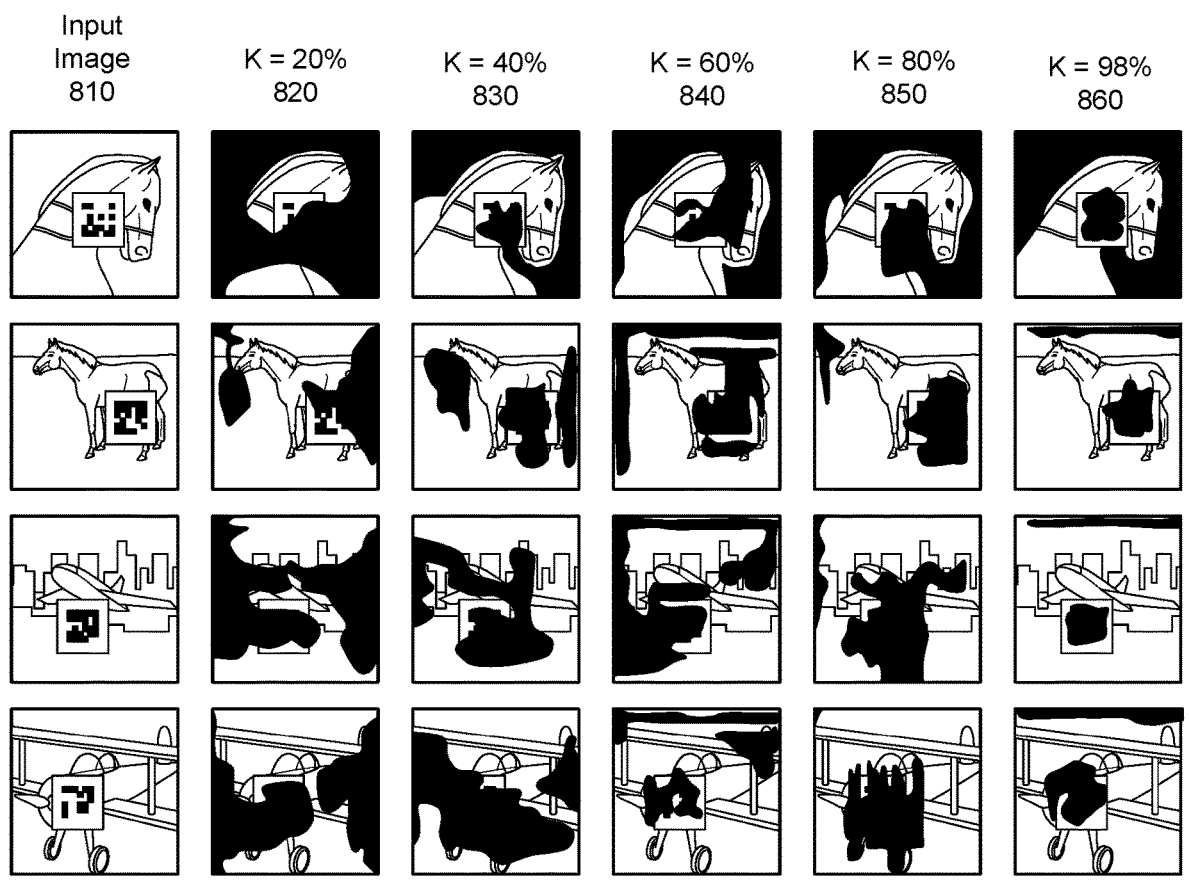
FIG. 8 shows a comparison of example masked images generated by the system of the present disclosure using different parameter values.

FIG. 8 shows example images generated by the masker component 210 using different values for the parameter K. In this example, the masker component 210 is configured to mask the image for an object recognition task, in particular for classifying the image as including a "horse" or an "airplane". The masker component 210 identifies pixels that correspond to a representation of a QR code and masks those pixels, since the QR code is irrelevant for the object classification task. The value of K is directly related to the amount of image data provided to an image processing task.

By varying the value of K, the percentage of pixels revealed in the masked image is varied. In some cases, for particular tasks, as the percentage of pixels K to be included in the masked image increases, the accuracy of the task also increases. The accuracy of the task saturates after a certain K value, which corroborates the idea that for a certain task, not all pixels in an image are required and that certain irrelevant pixels can be discarded/masked. Thus, the amount of image data provided to an image processing task can be reduced, for efficient processing. Using the K value, the least amount of data needed for the task performance component 430 to accurately perform its image processing task can be provided to the component 430. The masked images 620 are generated using a K value of 20% (i.e. 20% of the pixels in the input image 810 were kept in the masked image 620 to perform the object classification task). The masked images 630 are generated using a K value of 40%, the masked images 640 are generated using a K value of 60%, the masked images 650 are generated using a K value of 80%, and the masked images 660 are generated using a K value of 98%. As shown in the images of FIG. 8, the masker component 210 learns to discard the pixels of the QR-code as they are not required for the classification task. Using images 820 (K=20%) the task performance component 430 is able to classify the images, with a high level of confidence, into a "horse" or "airplane" category.

Figure 9:
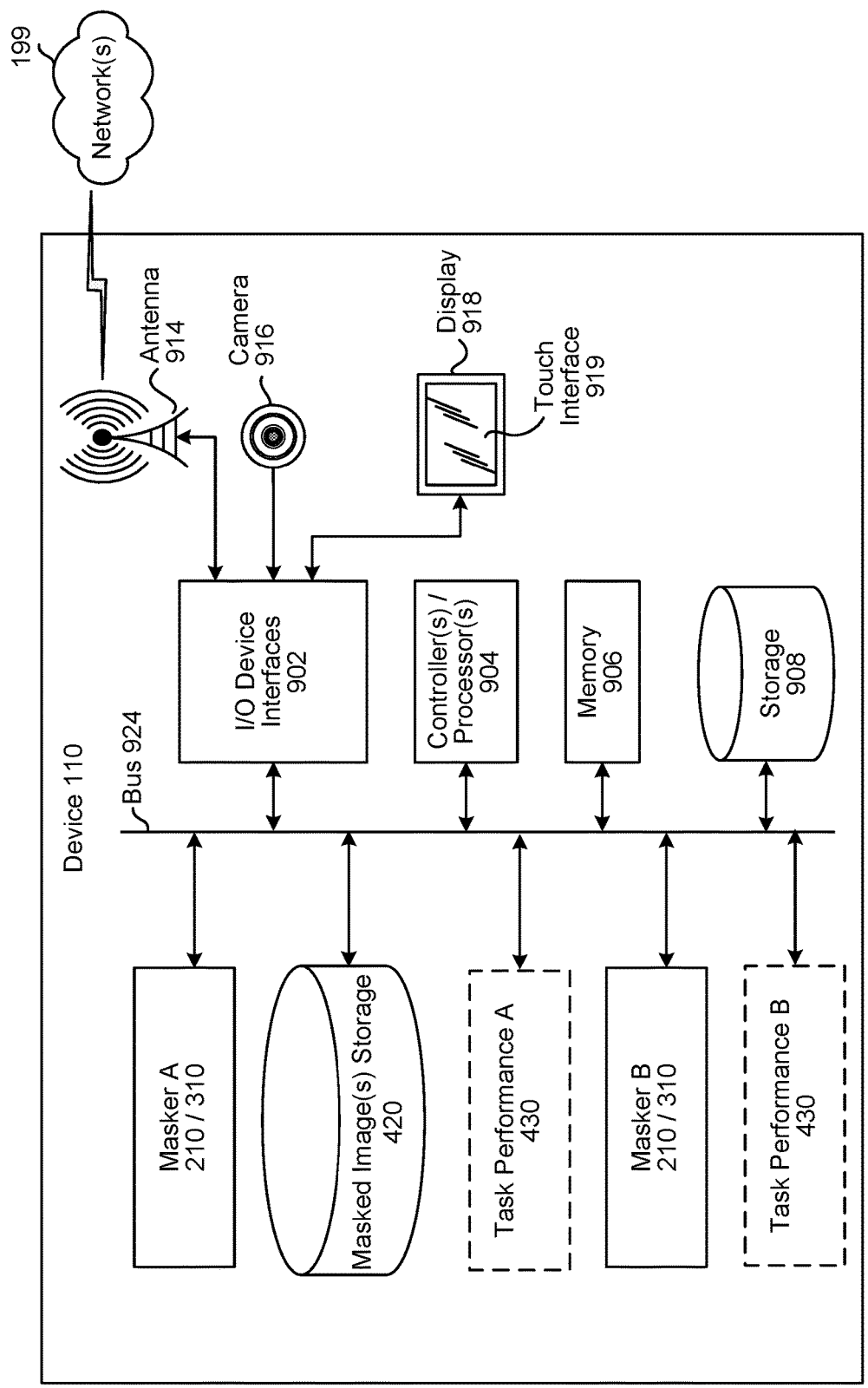
FIG. 9 is a block diagram conceptually illustrating example components of a device that can be used to capture an image and generate a masked image according to embodiments of the present disclosure.

FIG. 9 is a block diagram conceptually illustrating example components of the device 110 of the system 100. In operation, the device 110 may include computer-readable and computer-executable instructions that reside on the device 110, or that may reside on a network-connected device operating in conjunction with device 110, as will be discussed further below.

As illustrated in FIG. 9 the device 110 may include wireless network radio connectivity (e.g., antenna 914), one or more cameras (916), a display 918, and a user interface such as touch interface 919. "Camera" includes image capture systems used to capture images, and includes (among other things), cameras used for photography and for the capture of video. Image scanners such as flat-bed optical scanners may be substituted for a camera to capture the image or video frames (e.g., image data 402).

The display 918 may be a display of any suitable technology, such as a liquid crystal display, an organic light emitting diode display, electronic paper, an electrochromic display, or other suitable component(s). The cameras 916, display 918, and other components may be integrated into the device 110, or may be separate, connected to the device 110 by a wired or wireless connection.

The device 110 may include an address/data bus 924 for conveying data among components of the device 110. Each component within the device 110 may also be directly connected to other components in addition to (or instead of) being connected to other components across the bus 924.

The device 110 may include one or more controllers/processors 904 that may each include a central processing unit (CPU) for processing data and computer-readable instructions, and a memory 906 for storing data and instructions. The memory 906 may include volatile random access memory (RAM), non-volatile read only memory (ROM), non-volatile magnetoresistive (MRAM) and/or other types of memory. The device 110 may also include a data storage component 908, for storing data and controller/processor-executable instructions (e.g., instructions to perform masking functionalities described in relation to FIG. 4 and to perform a task). The data storage component 908 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 902.

Computer instructions for operating the device 110 and its various components (such as the engines 932 to 936 and 940 of the frame processing module 930) may be executed by the controller(s)/processor(s) 904, using the memory 906 as temporary "working" storage at runtime. The computer instructions may be stored in a non-transitory manner in non-volatile memory 906, storage 908, or an external device. Alternatively, some or all of the executable instructions may be embedded in hardware or firmware in addition to or instead of software.

The device 110 includes input/output device interfaces 902. A variety of components may be connected through the input/output device interfaces 902, such as the display 918, a speaker (not illustrated), a microphone (not illustrated), and the user interface (e.g., touch interface 919). The input/output device interfaces 902 may also include an interface for an external peripheral device connection such as universal serial bus (USB), Thunderbolt or other connection protocol. The input/output device interfaces 902 may also include a connection to one or more networks 199 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 199, the system 100 may be distributed across a networked environment, as discussed further below in connection with FIG. 11.

The device 110 further includes one or more masker components 210/310, where masker component A may be configured to mask images for a first task, and masker component B may be configured to mask images for a second task. The device 110 may further include one or more a task performance components 430, where task performance component A may be configured to perform the first task and the task performance component B may be configured to perform the second task.

Figure 10:
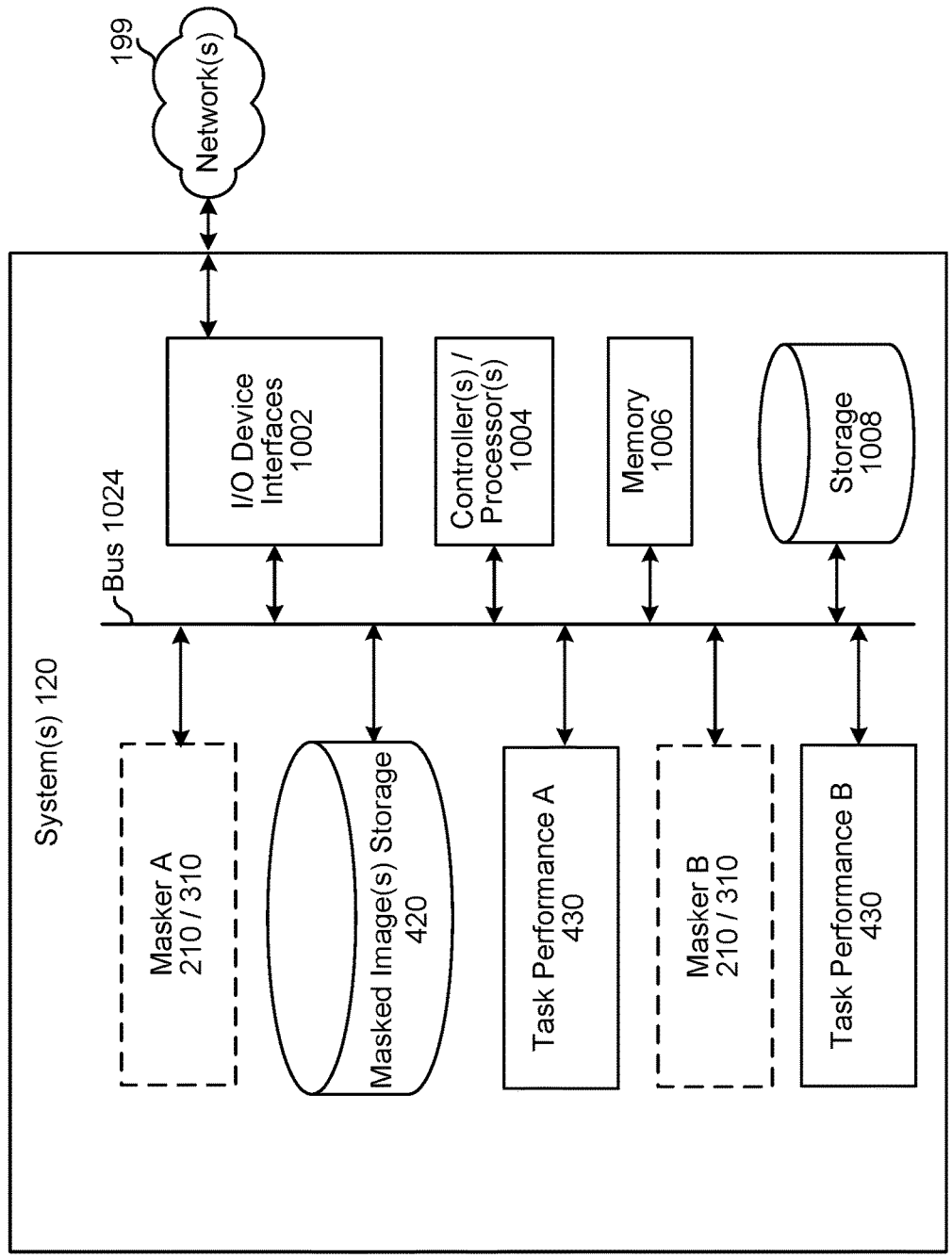
FIG. 10 is a block diagram conceptually illustrating example components of a remote system that can be used to generate a masked image and perform a task using the masked image according to embodiments of the present disclosure.

FIG. 10 is a block diagram conceptually illustrating example components of a network-connected system(s) 120 of the system 100. While some devices 110 that capture the image data 402 may be able to execute their own processing pipeline, the system 100 may delegate some tasks to the remote system(s) 120. To that end, the system(s) 120 may include one or more masker components 210/310, where masker component A may be configured to mask images for a first task, and masker component B may be configured to mask images for a second task. The system(s) 120 includes one or more task performance components 430, where task performance component A may be configured to perform the first task and the task performance component B may be configured to perform the second task.

The system(s) 120 may include an address/data bus 1024 for conveying data among components of the system(s) 120. Each component within the system(s) 120 may also be directly connected to other components in addition to (or instead of) being connected to other components across the bus 1024.

The system(s) 120 may include one or more controllers/processors 1004, that may each include a central processing unit (CPU) for processing data and computer-readable instructions, and a memory 1006 for storing data and instructions. The memory 1006 may include volatile random access memory (RAM), non-volatile read only memory (ROM), non-volatile magnetoresistive (MRAM) and/or other types of memory. The system(s) 120 may also include a data storage component 1008, for storing data and controller/processor-executable instructions (e.g., instructions to perform masking functionalities described in relation to FIG. 4 and to perform a task). The data storage component 1008 may include one or more non-volatile storage types such as magnetic storage, optical storage, solid-state storage, etc. The system(s) 120 may also be connected to removable or external non-volatile memory and/or storage (such as a removable memory card, memory key drive, networked storage, etc.) through the input/output device interfaces 1002.

Computer instructions for operating the system(s) 120 and its various components may be executed by the controller(s)/processor(s) 1004, using the memory 1006 as temporary "working" storage at runtime. The computer instructions may be stored in a non-transitory manner in non-volatile memory 1006, storage 1008, or an external device. Alternatively, some or all of the executable instructions may be embedded in hardware or firmware in addition to or instead of software.

The system(s) 120 includes input/output device interfaces 1002. A variety of components may be connected through the input/output device interfaces 1002. The input/output device interfaces 1002 may also include an interface for an external peripheral device connection such as universal serial bus (USB), Thunderbolt or other connection protocol. The input/output device interfaces 1002 may also include a connection to one or more networks 199 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 199, the system 100 may be distributed across a networked environment, discussed further below in connection with FIG. 11.

How tasks are divided between the device 110 and the system(s) 120 may be determined dynamically based on a speed of the connection via network(s) 199 to the system(s) 120. Based on criteria such as the speed of the network connection, the computational complexity of the process steps, and the computational capabilities of the controller(s)/processor(s) 1004, the system 100 may apply load balancing heuristics to dynamically divide processing steps between the device 110 and the system(s) 120.

The components of the device 110 as illustrated in FIG. 9 and the system(s) 120 as illustrated in FIG. 10 are exemplary, and may be a stand-alone device or may be included, in whole or in part, as a component of a larger device or system.

The concepts disclosed herein may be applied within a number of different devices and computer systems, including, for example, image-scanning general-purpose computing systems, server-client computing systems, smartphone computing systems, personal digital assistants (PDAs), cameras, image scanners, tablet computers, wearable computing devices (glasses, watches, etc.), other mobile devices, etc.

As illustrated in FIG. 11, multiple devices (110a-110g, 120) may contain components of the system 100 and the devices may be connected over a network(s) 199. The network(s) 199 may include a local or private network or may include a wide network such as the Internet. Devices may be connected to the network(s) 199 through either wired or wireless connections. For example, an augmented reality (AR) glasses 110a, a tablet computer 110b, a smart phone 110c, a camera 110d, a desktop computer 110e, a laptop computer 110f, and/or a speech-controlled device with display 110g may be connected to the network(s) 199 through a wireless service provider, over a WiFi or cellular network connection, or the like. Other devices are included as network-connected support devices, such as the system(s) 120, and/or others. The support devices may connect to the network(s) 199 through a wired connection or wireless connection. Networked devices may capture images using one-or-more built-in or connected cameras or other image capture devices, with processing performed by the masker component, task performance component, or other components of the same device or another device connected via the network(s) 199.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and image processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more of the masker component 410 and the task performance component 430 may be implemented as firmware in hardware. For example, portions of the masker component 410 and the task performance component 430 may be implemented as a digital signal processor (DSP) and/or application-specific integrated circuit (ASIC).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first image data representing a first image;
   selecting, from among a plurality of masker components, a first masker component configured to generate masked image data for classification processing; and
   processing the first image data using the first masker component, the processing comprising:
   determining, in the first image data, a first plurality of pixels as corresponding to a representation of a classification category, wherein the first plurality of pixels comprises a first pixel and a second pixel;
   determining, for the first pixel, first data indicating a first likelihood that the first pixel is relevant for the classification processing;
   determining, for the second pixel, second data indicating a second likelihood that the second pixel is relevant for the classification processing;
   determining, in the first image data, a second plurality of pixels are irrelevant for the classification processing;
   determining first pixel data to include the second plurality of pixels;
   determining, based on the second data, to include the second pixel in the first pixel data;
   determining second image data using the first pixel data and second pixel data associated with the first pixel, wherein the first pixel data is set to a value different than that corresponding to the second pixel and the second plurality of pixels; and
   processing the second image data, using a first task component, to determine classification data corresponding to the second image data.

2. The computer-implemented method of claim 1, further comprising:
   receiving third image data associated with a first label indicating a first classification category associated with the classification processing;
   processing the third image data using a first machine learning model associated with first model data;
   generating, by the first machine learning model, masked image data corresponding to the third image data, a first portion of the masked image data being relevant to the classification processing, a second portion of the masked image data being irrelevant to classification processing and being set to null value;
   using a second machine learning model, processing the masked image data to determine the first label;
   generating, by the second machine learning model, first model output data;
   using the first model data and the first model output data, determining second model data associated with the first machine learning model;
   associating the second model data with the first masker component;
   using the first model output data and the second model data, determining third model data associated with the second machine learning model; and
   associating the third model data with the first task component.

3. The computer-implemented method of claim 1, further comprising:
   receiving third image data associated with a first label indicating a first classification category;
   processing the third image data using a first machine learning model associated with first model data;
   generating, by the first machine learning model, first masked image data corresponding to the third image data, a first portion of the first masked image data being relevant for the classification processing, a second portion of the first masked image data being irrelevant for the classification processing, the second portion being set to null values;
   using a second machine learning model, processing the first masked image data to determine the first label;
   generating, by the second machine learning model, first model output data;
   using the first model data and the first model output data, determining second model data associated with the first machine learning model;
   generating complementary masked image data corresponding to the third image data, a third portion of the complementary masked image data being relevant for the classification processing, the third portion being set to zero value, and a fourth portion of the complementary masked image data being irrelevant for the classification processing;
   using a third machine learning model, processing the complementary masked image data to determine the first label;
   generating, by the third machine learning model, second model output data;
   using the first model data and the second model output data, determining third model data associated with the first machine learning model; and
   configuring the first masker component using the second model data and the third model data.

4. A computer-implemented method comprising:
   receiving first image data representing a first image, the first image data comprising a first portion to be included for performance of a first type of image processing and a second portion to be excluded for performance of the first type of image processing;
   selecting a first component configured to obscure at least the second portion of the first image data, the first component configured using at least second image data representing a second image, the second image data associated with an output label corresponding to the first type of image processing;
   using the first image data and the first component, determining third image data corresponding to the first image, the third image data including a first portion and a second portion, wherein:
   the first portion of the third image data corresponds to first pixel values representing the first portion of the first image data, and
   the second portion of the third image data includes second pixel values different from the first pixel values, the second pixel values representing the second portion of the first image data; and
   storing the third image data for further processing.

5. The computer-implemented method of claim 4, further comprising:
   determining, by the first component, a first likelihood that a first pixel of the first image data is to be included for the first type of image processing;
   determining, by the first component, a second likelihood that a second pixel of the first image data is to be included for the first type of image processing;

determining that the first likelihood satisfies a condition corresponding to a parameter value;

determining that the second likelihood fails to satisfy the condition;

based at least in part on the determining the first likelihood satisfies the condition, including the first pixel in the first portion of the first image data; and based at least in part on the determining the second likelihood fails to satisfy the condition, including the second pixel in the second portion of the first image data.

6. The computer-implemented method of claim 4, further comprising:

processing the third image data using a second component configured to perform the first type of image processing, the first type of image processing corresponding to classification of the first image data based on an object represented in the first image; and determining an output label corresponding to the third image data, the output label corresponding to the object.

7. The computer-implemented method of claim 4, wherein selecting the first component further comprises selecting the first component based at least in part on the first component being configured to obscure portions to be excluded for a classification task, and the computer-implemented method further comprises:

processing the third image data using a second component configured to perform the first type of image processing of classifying input images based at least in part on at least a first category and a second category; and determining classification data representing that the first category corresponds to the third image data.

8. The computer-implemented method of claim 4, further comprising:

selecting a second component configured to obscure portions of the first image to be excluded for performance of a second type of image processing;

using the second component, determining fifth image data corresponding to the first image, the fifth image data including a fourth portion and a fifth portion, wherein:
the fourth portion of the fifth image data corresponds to third pixel values representing the fourth portion is to be included for performance of the second type of image processing, and
the fifth portion of the fifth image data includes fourth pixel values different from the third pixel values, the fourth pixel values representing the fifth portion is to be excluded for performance of the second type of image processing; and storing the fifth image data for further processing.

9. The computer-implemented method of claim 4, further comprising:

receiving fourth image data representing a third image, the fourth image data comprising a first portion to be included for identifying an object in the third image and a second portion to be excluded for identifying an object in the third image;

selecting a second component configured to obscure the second portion of the fourth image data;

using the second component, determining fifth image data corresponding to the third image, the fifth image data including a fourth portion and a fifth portion wherein:
the fourth portion of the fifth image data corresponds to fifth pixel values representing the first portion of the fourth image data, and the fifth portion corresponds to sixth pixel values representing second portion of the fourth image data, the sixth pixel values being set to a null value; and storing the fifth image data for further processing.

10. The computer-implemented method of claim 4, further comprising:

processing the second image data using a first machine learning model associated with first model data;

generating, by the first machine learning model, masked image data corresponding to the second image data, a third portion of the masked image data to be included for performance of the first type of image processing, a fourth portion of the masked image data to be excluded for performance of the first type of image processing and being set to a null value;

using a second machine learning model, processing the masked image data to determine the output label associated with the second image data;

generating, by the second machine learning model, first model output data;

using the first model data and the first model output data, determining second model data associated with the first machine learning model; and associating the second model data with the first component.

11. The computer-implemented method of claim 10, further comprising:

generating complementary masked image data corresponding to the second image data, a fifth portion of the complementary masked image data to be included for performance of the first type of image processing and being set to zero value, a sixth portion of the complementary masked image data to be excluded for performance of the first type of image processing;

using a third machine learning model, processing the complementary masked image data to determine the output label associated with the second image data;

generating, by the third machine learning model, second model output data;

using the first model data and the second model output data, determining third model data associated with the first machine learning model; and configuring the first component using the second model data and the third model data.

12. The computer-implemented method of claim 4, further comprising:

executing, by a user device, the first component to determine the third image data;

sending, by the user device to a remote system, the third image data;

processing, by the remote system, the third image data using a second component to classify the first image into at least one of first category or a second category; and determining classification data corresponding to the third image data, the classification data indicating that the first category corresponds to the first image.

13. A system comprising:

at least one processor; and at least one memory including instructions that, when executed by the at least one processor, cause the system to:

receive first image data representing a first image, the first image data comprising a first portion to be included for performance of a first type of image processing and a second portion to be excluded for performance of the first type of image processing;

select a first component configured to obscure at least the second portion of the first image data, the first component configured using at least second image data representing a second image, the second image data associated with an output label corresponding to the first type of image processing;

using the first image data and the first component, determine third image data corresponding to the first image, the third image data including a first portion and a second portion, wherein:

the first portion of the third image data corresponds to first pixel values representing the first portion of the first image data, and the second portion of the third image data includes second pixel values different from the first pixel values, the second pixel values representing the second portion of the first image data; and store the third image data for further processing.

14. The system of claim 13, wherein the instructions that, when executed by the at least one processor, further cause the system to:

determine, by the first component, a first likelihood that a first pixel of the first image data is to be included for the first type of image processing;

determine, by the first component, a second likelihood that a second pixel of the first image data is to be included for the first type of image processing;

determine that the first likelihood satisfies a condition corresponding to a parameter value;

determine that the second likelihood fails to satisfy the condition;

based at least in part on the determining the first likelihood satisfies the condition, include the first pixel in the first portion of the first image data; and based at least in part on the determining the second likelihood fails to satisfy the condition, include the second pixel in the second portion of the first image data.

15. The system of claim 13, wherein the instructions that, when executed by the at least one processor, further cause the system to:

process the third image data using a second component configured to perform the first type of image processing, the first type of image processing corresponding to classification of the first image data based on an object represented in the first image; and determine an output label corresponding to the third image data, the output label corresponding to the object.

16. The system of claim 13, wherein the instructions that, when executed by the at least one processor, wherein the instructions that cause the system to select the first component, further cause the system to:

select the first component based at least in part on the first component being configured to obscure portions to be excluded for a classification task;

process the third image data using a second component configured to perform the first type of image processing of classifying input images based at least in part on at least a first category and a second category; and determine classification data representing that the first category corresponds to the third image data.

17. The system of claim 13, wherein the instructions that, when executed by the at least one processor, further cause the system to:

select a second component configured to obscure portions of the first image to be excluded for performance of a second type of image processing;

using the second component, determine fifth image data corresponding to the first image, the fifth image data including a fourth portion and a fifth portion, wherein:

the fourth portion of the fifth image data corresponds to third pixel values representing the fourth portion is to be included for performance of the second type of image processing, and the fifth portion of the fifth image data includes fourth pixel values different from the third pixel values, the fourth pixel values representing the fifth portion is to be excluded for performance of the second type of image processing; and store the fifth image data for further processing.

18. The system of claim 13, wherein the instructions that, when executed by the at least one processor, further cause the system to:

receive fourth image data representing a third image, the fourth image data comprising a first portion to be included for identifying an object in the third image and a second portion to be excluded for identifying an object in the third image;

select a second component configured to obscure the third image the second portion of the fourth image data;

using the second component, determine fifth image data corresponding to the third image, the fifth image data including a fourth portion and a fifth portion wherein:

the fourth portion of the fifth image data corresponds to fifth pixel values representing the first portion of the fourth image data, and the fifth portion corresponds to sixth pixel values representing second portion of the fourth image data, the sixth pixel values being set to a null value; and store the fifth image data for further processing.

19. The system of claim 13, wherein the instructions that, when executed by the at least one processor, further cause the system to:

process the second image data using a first machine learning model associated with first model data;

generate, by the first machine learning model, masked image data corresponding to the second image data, a third portion of the masked image data to be included for performance of the first type of image processing, a fourth portion of the masked image data to be excluded for performance of the first type of image processing and being set to a null value;

using a second machine learning model, process the masked image data to determine the output label associated with the second image data;

generate, by the second machine learning model, first model output data;

using the first model data and the first model output data, determine second model data associated with the first machine learning model; and associate the second model data with the first component.

20. The system of claim 19, wherein the instructions that, when executed by the at least one processor, further cause the system to:

generate complementary masked image data corresponding to the second image data, a fifth portion of the complementary masked image data to be included for performance of the first type of image processing and being set to zero value, a sixth portion of the complementary masked image data to be excluded for performance of the first type of image processing;

using the third machine learning model, process the complementary masked image data to determine the output label associated with the second image data;
generate, by the third machine learning model, second model output data;
using the first model data and the second model output data, determine third model data associated with the first machine learning model; and
configure the first component using the second model data and the third model data.

* * * * *